United States Patent Office 3,477,293
Patented Nov. 11, 1969

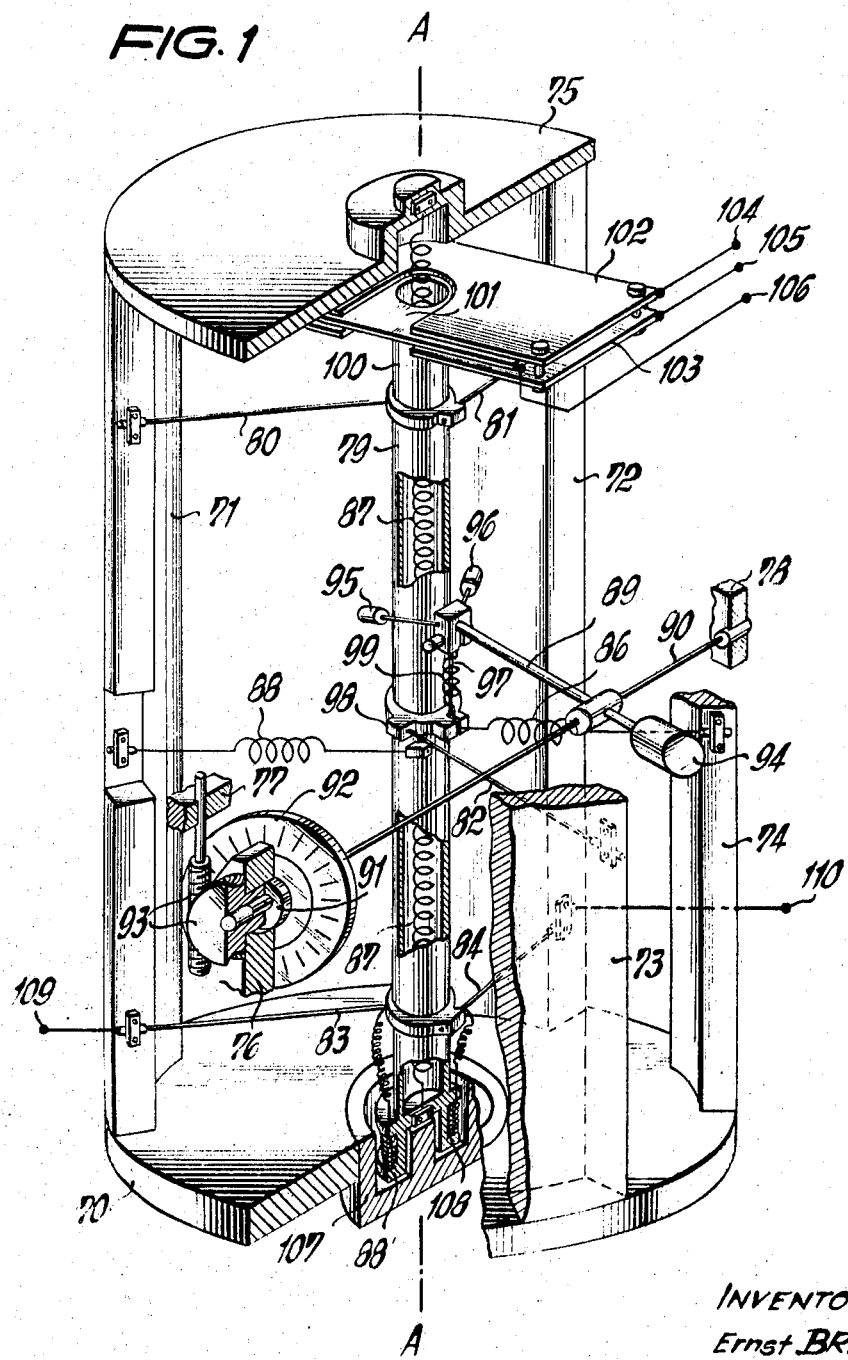

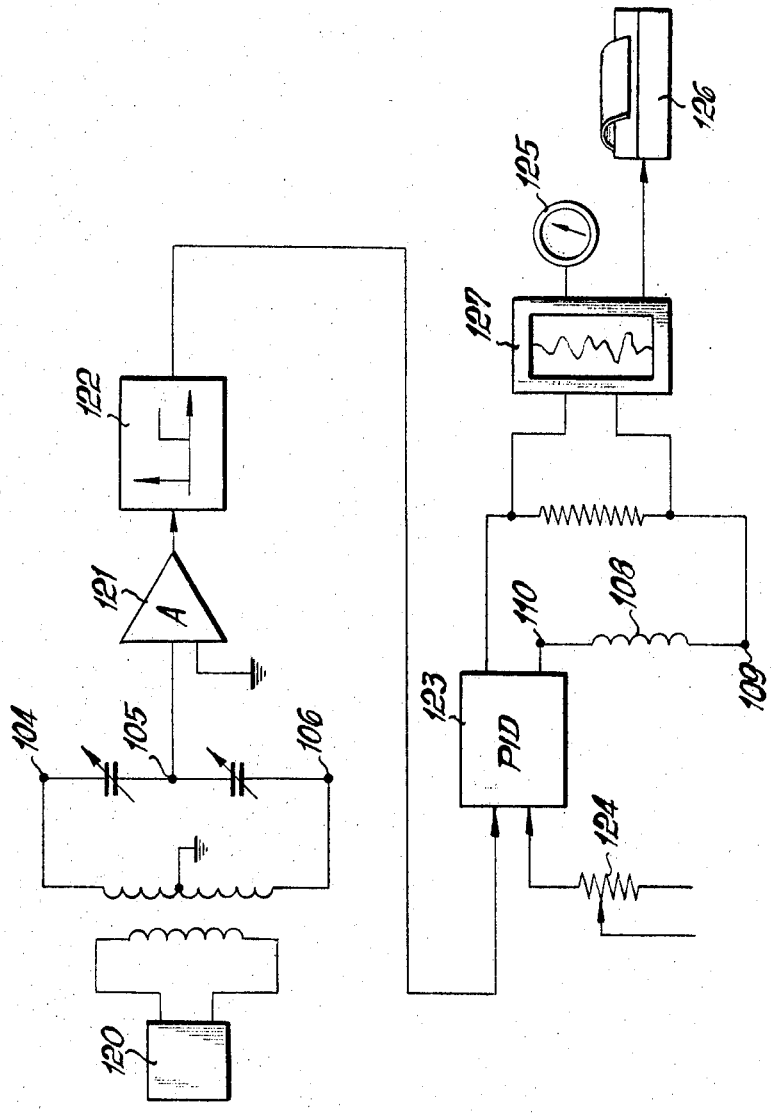

3,477,293
APPARATUS FOR MEASURING TERRESTRIAL GRAVITY FROM A MOVING VEHICLE
Ernst Brede, Berlin, Gemany, assignor to Continental Elektroindustrie A.G., Berlin-Mariendorf, Germany, a corporation of Germany
Filed July 19, 1967, Ser. No. 654,495
Claims priority, application Germany, Apr. 27, 1967, C 42,157
Int. Cl. G01m 1/12
U.S. Cl. 73—382      8 Claims

ABSTRACT OF THE DISCLOSURE

Apparatus for measuring gravity from a moving vehicle, comprises a housing and a gravitational mass mounted in the housing for oscillatory movement along its axis from a zero position and for rotation about its axis. An electrical device is coupled to the gravitational mass for producing an electrical signal corresponding to the position of the gravitational mass relative to the zero position and to the housing. A recording device coupled to the electrical device records an electrical signal varying with the gravity acting on the mass. A guide is coupled to the gravitational mass for restricting the gravitational mass to a rectilinear path of gravity-responsive motion away from the zero position along the axis of the gravitational mass in a vertical direction. The guide comprises a plurality of spaced filamentary tensioning members affixed to the housing and the gravitational mass in different planes spaced from each other. Each of the tensioning members is affixed to the housing and the gravitational mass whereby it extends taut in a substantially tangential direction relative to the gravitational mass and flexible in a direcion substantially parallel to the axis of the gravitational mass. Tension springs are affixed to the housing and the gravitational mass for imparting a torque on the gravitational mass for tensioning the filamentary tensioning members whereby such springs extend taut in substantially tangential directions relative to the gravitational mass and flexible in a direction substantially parallel to the axis of the gravitational mass.

---

The present invention relates to a gravimeter. More particularly, the invention relates to apparatus for measuring terrestrial gravity from a moving vehicle.

The gravimeter of the present invention measures the gravity of the earth from a vehicle such as, for example, a ship, an aircraft, or the like, moving on a geographic course. The gravimeter apparatus comprises a housing having a mass mounted for oscillatory movement and subjected to displacement from a zero position against restoring forces. A device determines the position of the mass relative to the housing and converts such determination into an electrical measuring signal. The electrical measuring signal is supplied to a measuring device, which indicates the gravity to be measured. In the measuring device, the mass is guided in a rectilinear path of gravity responsive motion away from its zero position and is restored to its zero position in accordance with the electrical measuring signal. The mass is guided in a rectilinear path by a guide comprising a plurality of filamentary tensioning members which are positioned in different planes and which apply force to the mass.

Gravimeters of the aforesdescribed type are described in German Patent No. 1,006,170 and in United States pending patent application Ser. No. 654,495 filed concurrently herewith and assigned to the assignee of the present invention. In a gravimeter having a mass which is mounted for oscillation about a horizontal axis, the so-called "cross-coupling effect" occurs upon the occurrence of specific phase relations between the forces acting upon the gravimeter mass in the horizontal plane and those forces acting in the vertical plane. The cross-coupling effect causes spurious forces to be superimposed upon the forces directed primarily in vertical directions and thereby falsifies the measuring result provided by the gravimeter.

In order to minimize the cross-coupling effect, it is thus preferable to prevent the movement of the gravitational mass about a horizontal axis and to permit only translatory movement of said gravitational mass in a rectilinear path. In the aforementioned Germant patent, apparatus is disclosed for preventing movement of the gravitational mass about a horizontal axis and for permitting only translatory movement of the gravitational mass in a rectilinear path. In such apparatus, however, considerable translatory movement of the gravitational mass cannot be attained, so that the translatory movement is insufficient and the range of direct measurement of the gravimeter is small.

The guiding of the gravitational mass has been attempted by apparatus utilizing rollers or wheels. The operation of the rollers and wheels is influenced by friction, however, so that the sensitivity, and therefore the accuracy of measurement, of the gravimeter are reduced. In other attempts, the gravitational mass has been held in its path by leaf springs or flat springs, which abut such mass. The springs permit greater mobility of the gravitational mass, but when there are greater deflections, the gravitational mass is inclined toward its path and thereby disturbs the linearity of the indications provided by the measuring device.

The principal object of the present invention is to provide a new and improved gravimeter. The gravimeter of the present invention insures exact and sufficient translatory movement of the gravitational mass in a rectilinear path. The gravimeter of the present invention provides gravity measurements with adequate linearity of indications, accuracy, efficiency, effectiveness and reliability.

In accordance with the present invention, apparatus for measuring gravity from a moving vehicle comprises a housing. A gravitational mass is mounted in the housing for oscillatory movement along its axis from a zero position and for rotation about its axis. An electrical device coupled to the gravitational mass produces an electrical signal corresponding to the position of the gravitational mass relative to the zero position and to the housing. A recording device coupled to the electrical device records an electrical signal varying with the gravity acting on the mass. A guide is coupled to the gravitational mass for restricting the gravitational mass to a rectilinear path of gravity-responsive motion away from the zero position along the axis of the gravitational mass in a vertical direction. The guide comprises a plurality of spaced filamentary tensioning members affixed to the housing and the gravitational mass in different planes spaced from each other. Each of the tensioning members is affixed to the housing and the gravitational mass whereby it extends taut in a substantially tangential direction relative to the gravitational mass and flexible in a direction substantially parallel to the axis of the gravitational mass. Tension spring means is affixed to the housing and the gravitational mass for imparting a torque on the gravitational mass for tensioning the filamentary tensioning members whereby the tension spring means extends taut in a substantially tangential direction relative to the gravitational mass and flexible in a direction substantially tangential direction relative to the substantially parallel to the axis of the gravitational mass.

The electrical device is capacitively coupled to the gravitational mass. The electrical device comprises a differential capacitor having a pair of fixed spaced parallel end plates and an intercediate plate mounted on the gravitational mass and spaced from and parallel to each of the end plates. The tension means comprises a pair of tension springs each affixed at one end to the housing and each affixed at the other end to the gravitational mass in a manner whereby it extends in a substantially tangential direction relative to the gravitational mass.

The gravitational mass is mounted on a tension spring, affixed to the housing in a manner whereby the filamentary tensioning members are maintained in tension. A calibrator is coupled to the gravitational mass by spring means for adjusting the zero position of the gravitational mass.

In order that the present invention may be readily carried into effect, it will now be described with reference to the accompanying drawings, wherein:

FIG. 1 is a perspective view, partly cut away and partly in section, of an embodiment of the gravimeter of the present invention; and FIG. 2 is a block and circuit diagram of the electrical system of the gravimeter of the present invention.

In the present disclosure, the term "horizontal" is not necessarily intended to indicate horizontal in the strict sense, but indicates the plane in which the journal axis of the gravimeter is located. If the gravimeter of the present invention is aboard a space vehicle, the horizontal plane is not necessarily horizontal in the terrestrial sense. In order to simplify the disclosure, however, the gravimeter is assumed to be in terrestrial use, so that the horizontal plane is in fact a horizontal plane.

In FIG. 1, a base plate 70 is rigidly affixed to the housing of the gravimeter or is integral therewith. A head plate 75 is rigidly affixed to the base plate 70 by support members 71, 72, 73 and 75. Components 76, 77 and 78 are rigidly affixed to the housing of the gravimeter or are integral therewith.

A gravitational mass 79 is sleeve-shaped or tubular and functions as the gravitational mass of the gravimeter. The mass 79 is vertically suspended from the head plate 75, so that its axis A—A is coincident with a vertical line through the centers of the base and head plates 70 and 75. The mass 79 is thus rotatably mounted about the axis A—A.

A plurality of filamentary tensioning members 80, 81, 82, 83 and 84 comprising, for example, tapes, braided filaments, wires, or the like, and preferably comprising wires, are utilized to position the gravitational mass 79 in the vertical direction. One end of each of the tensioning wires 80, 81, 82, 83 and 84 is secured in a sleeve by any suitable means such as, for example, cement or solder, and each of such sleeves is fastened to or in corresponding ones of the support members 71, 72, 73 and 74 by any suitable means such as, for example, clamps. The other end of each of the tensioning wires 80, 81, 82, 83 and 84 is affixed to the gravitational mass 79 by any suitable means such as, for example, clamps.

Each of the tensioning wires 80, 81, 82, 83 and 84 may have a circular cross-sectional area. The tensioning wires 80 and 81 are coplanarly positioned in a horizontal plane at the upper part of the mass 79. The tensioning wires 83 and 84 are coplanarly positioned in a horizontal plane, spaced from that of the tensioning wires 80 and 81, at the lower part of the mass 79. The tensioning wire 82 is in a plane approximately equidistantly spaced from and intermediate the plane of the tensioning wires 80 and 81 and the plane of the tensioning wires 83 and 84.

The tensioning wires 80 and 83 are parallel to each other and the tensioning wires 81 and 84 are parallel to each other. The tensioning wire 80 is connected between the support member 71 and the gravitational mass 79. The tensioning wire 81 is connected between the support member 72 and the gravitational mass 79. The tensioning wire 82 is connected between the support member 73 and the gravitational mass 79. The tensioning wire 83 is connected between the support member 71 and the gravitational mass 79. The tensioning wire 84 is connected between the support member 72 and the gravitational mass 79.

The tensioning wires 80, 81, 82, 83 and 84 are affixed to the gravitational mass 79 tangentially, so that each of said tensioning wires extends taut in a substantially tangential direction relative to said mass and to the axis A—A. A tension spring 86 is affixed between the gravitational mass 79 and the support member 74 with one end of said spring secured in a sleeve by any suitable means and fastened to or in said support member, and the other end affixed to said gravitational mass. A tension spring 88 is affixed between the gravitational mass 79 and the support member 71 with one end of said spring secured in a sleeve by any suitable means and fastened to or in said support member, and the other end affixed to said gravitational mass.

The tension springs 86 and 88 are affixed to the gravitational mass 79 tangentially, so that each of said tension springs extends in a substantially tangential direction relative to said mass and to the axis A—A. Thus, the tensioning wires 80, 81, 82, 83 and 84 and the tension springs 86 and 88 exert a torsional moment upon the gravitational mass 79, so that said tensioning wires are kept under tension. The tension springs 86 and 88 are selected with regard to their elastic or resilient properties which are such that said springs cannot be placed under tension under normal forces of inertia which are effective in a horizontal plane and which affect the operation of or influence the operation or results of the gravimeter.

A helical tension spring 87 is coaxially positioned inside the gravitational mass 79. The tension spring 87 is affixed at its upper end to the head plate 75 and is affixed at its lower end to a bottom part 88' of the gravitational mass 79. The tension spring 87 thus supports the gravitational mass 79.

When the gravimeter is in use, the housing is mounted on a gyro-stabilized platform, so that a journal axis of the gravimeter is always in a horizontal plane. The journal axis is identical with the axis of a rod, torsion bar or tensioning wire 90 on which a lever arm 89 is seated by a bearing sleeve to which said lever arm is affixed, so that said lever arm rotates with said rod. Since the rod 90 is a tensioning wire, it can rotate about its own axis, for the purpose of forming the journal axle for the gravimeter mass.

The tensioning wire or rod 90 is affixed to the housing components 76 and 78 at its ends by any suitable means such as, for example, clamps. A hub 91 is affixed to the rod 90 at one end thereof and rotates with said rod about the axis of said rod in the housing component 76. A circular dial disc 92 of transparent material, such as glass or plastic, for example, is coaxially mounted on the rod 90. A scale of protractor indicia is provided on the disc 92. The hub 91 is rotatably mounted in the housing component 76 and is driven by worm gear components 93 which mesh with each other. One of the worm gear components 93 is journalled in the housing component 77 and functions to rotatably adjust the hub 91 and therefore the disc 92.

The rod 90 extends coaxially through an axial aperture through the hub 91 and through an axial aperture through the disc 92, so that turning of the worm gear component 93 which is rotatably mounted in the housing component 77 produces rotation of said disc. The angular position of the disc 92 is an indication of the pre-tension of the rod 90 and therefore of the force exerted on the lever arm 89. The indication of force exerted on the lever arm 89 may be read by visual observation of the scale on the disc 92 via an optical reading device of microscope type (not shown in the figure). Thus, the force exerted on the lever arm 89 may be varied or adjusted by varying or adjusting the pre-tension of the torsion bar 90 via the worm gear components 93.

A buoyancy weight 94 is affixed to one end of the lever arm 89 which is farthest from the gravitational mass 79. The buoyancy weight 94 functions to compensate for active buoyancy forces. A pair of spaced calibrating or adjusting weights 95 and 96 are affixed to the other end of the lever arm 89 which is closest to the gravitational mass 79. If the weights 95 and 96 are shifted in position, the gravimeter may be calibrated so that the center of gravity of the lever arm 89 is located on the journal axis 90. Forces acting on the gravimeter from the outside are thereby prevented from exerting a torsional moment upon the lever arm 89.

A filament 97 is affixed at its upper end to the end of the lever arm 89 closest to the mass 79 by any suitable means such as, for example, a clamp. The filament is affixed at its lower end to a clamp projection 98 mounted on and affixed to the gravitational mass 79. The filament is affixed to the clamp projection 98 by any suitable means such as, for example, a clamp.

A helical compression and torsion spring 99 is coaxially positioned around the filament 97 and is affixed at its upper end to the end of the lever arm 89 closest to the mass 79. The spring 99 is affixed at its lower end to the clamp projection 98. The spring 99 is affixed by any suitable means to the lever arm 89 and to the clamp projection 98. The spring 99 is pre-tensioned by torsion and thereby maintains the five tensioning wires 80, 81, 82, 83 and 84 taut under tension. The spring 99 also functions as a pressure spring and thereby maintains the filament 97 taut under tension independently of forces acting on the gravitational mass 79.

The filament 97 is a link connecting the lever ram 89 to the gravitational mass 79. The tensioning wires 80, 81, 82, 83 and 84 function as a guide for the gravitational mass 79 and permit its displacement only in vertical rectilinear directions. The torsion bar 90 functions in the conventional manner to adjust the zero position of the gravimeter or to calibrate said gravimeter and the scale indication of the disc 92. The calibration of the gravimeter or the variation of its measuring range is accomplished by the design of the apparatus in a manner whereby the weight of the gravitational mass 79 not compensated by the tension spring 87 is compensated by the torsion forces of the torsion bar or rod 90, so that variation of the pre-tension of said torsion bar permits variation of the measuring range of the gravimeter.

The upper part 100 of the gravitational mass 79 comprises electrically insulative material. A metal plate 101 is rigidly affixed to the electrical insulation part 100 of the mass 79. The plate 101 is positioned between a pair of spaced parallel metal plates 102 and 103 which are affixed via suitable electrical insulating means to the housing of the gravimeter. The intermediate plate 101 is spaced from and parallel to the end plates 102 and 103. The three plates 101, 102 and 103 cooperate with each other and are electrically connected in a manner by which they function as a differential or variable capacitor. The variable capacitor 101, 102, 103 has electrical terminals 104, 105 and 106. The terminal 104 is connected to the plate 102, the terminal 105 is connected to the plate 103 and the terminal 106 is connected to the plate 101.

When the differential capacitor 101, 102, 103 is energized by an AC voltage applied to its electrical terminals 104 and 106, it provides at its electrical terminal 105 an AC voltage having an amplitude which is zero when the plate 101 is in its zero position, equidistant from the plates 102 and 103. The amplitude of the AC voltage provided by the differential capacitor 101, 102, 103 at its terminal 105 increases linearly with the magnitude of displacement of the intermediate plate 101 from its zero position. The phase angle of the AC voltage provided at the terminal 105 of the differential capacitor 101, 102, 103 shifts 180° when the intermediate plate 101 passes through its zero position.

A permanent magnet 107 is mounted in the base plate 70 in coaxial relation with the gravitational mass 79. An excitation winding 108 is wound around the bottom part 88' of the gravitational mass 79. The bottom part 88' of the mass 79 and the excitation winding 108 are movable in the air gap of the permanent magnet 107, so that as said mass moves, said excitation winding moves to the same extent into or out of said air gap.

One end of the excitation winding 108 is connected to the tensioning wire 83 and thence to an electrical terminal 109 and the other end of said excitation winding is connected to the tensioning wire 84 and thence to an electrical terminal 110. The tensioning wires 83 and 84 and their terminals 109 and 110 are electrically insulated from the support members 71 and 72, respectively, and from the gravitational mass 79. The clamp projection of the gravitational mass 79 by which the tensioning wires 83 and 84 are affixed to said mass may comprise electrically insulative material, as may the clamps which affix said tensioning wires to the support members 71 and 72, respectively.

As shown in FIG. 2, an AC voltage is applied to the terminals 104 and 106 of the differential capacitor 101, 102, 103 (FIG. 1), as hereinbefore described, by a high frequency oscillator 120 of any suitable type and an input transformer. The transformer has a primary winding connected to the output of the oscillator 120 and a secondary winding having a grounded center tap, one end of which is connected to the terminal 104 of the differential capacitor 101, 102, 103 and the other end of which is connected to the terminal 106 of said differential capacitor.

The terminal 105 of the differential capacitor 101, 102, 103 is connected to the input of an amplifier 121. The output of the amplifier 121 is connected to one input of an electrical regulator 123 via a low pass filter 122. An auxiliary voltage from a potentiometer 124 is applied to the other input of the electrical regulator 123. The regulator 123 functions to additively superimpose the auxiliary voltage upon the voltage from the low pass filter 122. The regulator 123 may comprise any suitable control system for controlling the movement of the bottom part 88' via the excitation winding 108 in accordance with the difference voltage provided by the differential capacitor 101, 102, 103 in the sense required to reduce said difference voltage to zero.

The regulator 123 preferably comprises a PID or PDI type regulator which performs a combination of proportional, differential and integral control as described in United States pending Patent Application Serial No. 654,494 (FIG. 6) filed concurrently herewith July 19, 1967 and assigned to the assignee of the present invention. A suitable regulator of the type described is disclosed on pages 771 to 773 of a textbook entitled "Feedback Control Systems," by Gille, Pelegrin and Becauline, 1959, McGraw-Hill Book Company, Inc. A suitable regulator is also disclosed in the German standards published as "Regelungstechnik" DIN–19226.

The output of the regulator 123 is connected to the excitation winding 108 via the terminals 109 and 110. The difference voltage provided by the differential capacitor 101, 102, 103, which varies in amplitude in accordance with the position of the gravitational mass 79, relative to the housing of the gravimeter, thus, after amplification, filtering and regulation, provides in the excitation winding 108 a current which is proportional to said position of said gravitational mass. The current through the excitation winding 108 energizes said winding to produce a magnetic field which reacts with the magnetic field of the permanent magnet 107 in a manner whereby a force is produced which moves the gravitational mass 79 in a direction opposite to that in which it is displaced and for an equal distance. The measuring apparatus thus produces an opposing force to the displacement of the gravitational mass 79. The forces acting in a vertical plane thus prevent the gravitational mass 79 from departing more than slightly from its zero position.

The current provided by the amplifier 121 fluctuates in amplitude, in the aforedescribed manner, under the influence of outside forces, and, with the assistance of the regulator 123, the gravitational mass 79 essentially maintains its zero position. The zero position of the gravitational mass 79 is predetermined and preset by adjustment of the torsion moment of the torsion bar 90.

The current in the excitation winding 108 is indicative of the forces acting on the gravitational mass 79, so that the magnitude of said current is recorded by any suitable recording means such as, for example, an analog recorder 127. The recorder 127 records the amplitude of the current in the excitation winding 108 as a function of time or of the geographical location of the vehicle carrying the gravimeter. An electrical measuring instrument 125 of any suitable type indicates the mean amplitude of the current flowing through the excitation winding 108. A printer 126 of any suitable type may be utilized to print the mean current amplitude data indicated by the instrument 125 or to print the numerical representations, relative to time, of the current amplitude data recorded by the recorder 127.

While the invention has been described by means of a specific embodiment, I do not wish to be limited thereto, for obvious modifications will occur to those skilled in the art without departing from the spirit and scope of the invention.

I claim:
1. Apparatus for measuring gravity from a moving vehicle, comprising a housing; a gravitational mass mounted in said housing for oscillatory movement along its axis from a zero position and for rotation about its axis; electrical means coupled to said gravitational mass for producing an electrical signal corresponding to the position of said gravitational mass relative to said zero position and to said housing; recording means coupled to said electrical means for recording an electrical signal varying with the gravity acting on said mass; and guide means coupled to said gravitational mass for restricting said gravitational mass to a rectilinear path of gravity-responsive motion away from said zero position along the axis of said gravitational mass in a vertical direction, said guide means comprising a plurality of spaced filamentary tensioning members affixed to said housing and said gravitational mass in different planes spaced from each other, each of said tensioning members being affixed to said housing and said gravitational mass whereby it extends taut in a substantially tangential direction relative to said gravitational mass and flexible in a direction substantially parallel to the axis of said gravitational mass, and tension spring means affixed to said housing and said gravitational mass for imparting a torque on said gravitational mass for tensioning said filamentary tensioning members whereby said tension spring means extends taut in a substantially tangential direction relative to said gravitational mass and flexible in a direction substantially parallel to the axis of the gravitational mass.

2. Apparatus as claimed in claim 1, wherein said electrical means is capacitively coupled to said gravitational mass.

3. Apparatus as claimed in claim 1, wherein said electrical means comprises a differential capacitor having a pair of fixed spaced parallel end plates and an intermediate plate mounted on said gravitational mass and spaced from and parallel to each of said end plates.

4. Apparatus as claimed in claim 1, wherein said tension spring means comprises a tension spring affixed at one end to said housing and affixed at the other end to said gravitational mass in a manner whereby it extends in a substantially tangential direction relative to said gravitational mass.

5. Apparatus as claimed in claim 1, wherein said tension spring means comprises a pair of tension springs each affixed at one end to said housing and each affixed at the other end to said gravitational mass in a manner whereby it extends in a substantially tangential direction relative to said gravitational mass.

6. Apparatus as claimed in claim 1, wherein said gravitational mass is mounted on a tension spring which is positioned coaxially with the axis of said gravitational mass and affixed to said housing.

7. Apparatus as claimed in claim 1, further comprising calibrating means coupled to said gravitational mass by spring means for adjusting the zero position of said gravitational mass.

8. Apparatus as claimed in claim 3, wherein said tension spring means comprises a pair of tension springs each affixed at one end to said housing and each affixed at the other end to said gravitational mass in a manner whereby it extends in a substantially tangential direction relative to said gravitational mass.

References Cited
UNITED STATES PATENTS 3,323,372   6/1967   Kistler et al. _____ 73—517

JAMES J. GILL, Primary Examiner

J. R. FLANAGAN, Assistant Examiner.